P. D. FORSHEY AND W. J. FISH.
BEATER ATTACHMENT.
APPLICATION FILED APR. 15, 1921.

1,434,536.

Patented Nov. 7, 1922.

Inventors
P. D. Forshey and
W. J. Fish

By Jacolin & Jacolin
Attorneys

Patented Nov. 7, 1922.

1,434,536

UNITED STATES PATENT OFFICE.

PAUL D. FORSHEY AND WINFIELD J. FISH, OF HAMILTON, OHIO.

BEATER ATTACHMENT.

Application filed April 15, 1921. Serial No. 461,506.

*To all whom it may concern:*

Be it known that we, (1) PAUL D. FORSHEY and (2) WINFIELD J. FISH, citizens of the United States, residing at Hamilton, in the county of Butler and State of Ohio, have invented certain new and useful Improvements in Beater Attachments, of which the following is a specification.

This invention relates to new and useful improvements in beating attachments for use in connection with pulp beating machines, and the primary object of the invention is to provide a device which will provide for the changing of the stock or pulp from one side of the course to the other to promote homogeneous mixture of the stock and reduce the beating time.

A further object of the invention resides in providing a member which is pivotally supported in position back of the beater roll to transfer to stock leaving the beater from one side of the course to the other, thus causing better circulation and obtaining a more uniform length of fibre in a shorter space of time than is ordinarily accomplished.

Still another object of the invention resides in providing a spout-like attachment pivotally supported on the hood of the beater and provided with two separate and diagonally crossing channels so as to accomplish the results hereinabove desired.

Still another object of the invention resides in providing a device which is simple and durable in construction, inexpensive to manufacture and one which is very efficient and useful in operation.

With these and other objects in view our invention consists in the novel features of construction, combination and arrangement of parts as will be hereinafter referred to and more particularly pointed out in the specification and claims.

In the accompanying drawings forming a part of this application—

Fig. 6 is a front elevation of our attachment removed.

Figure 1:
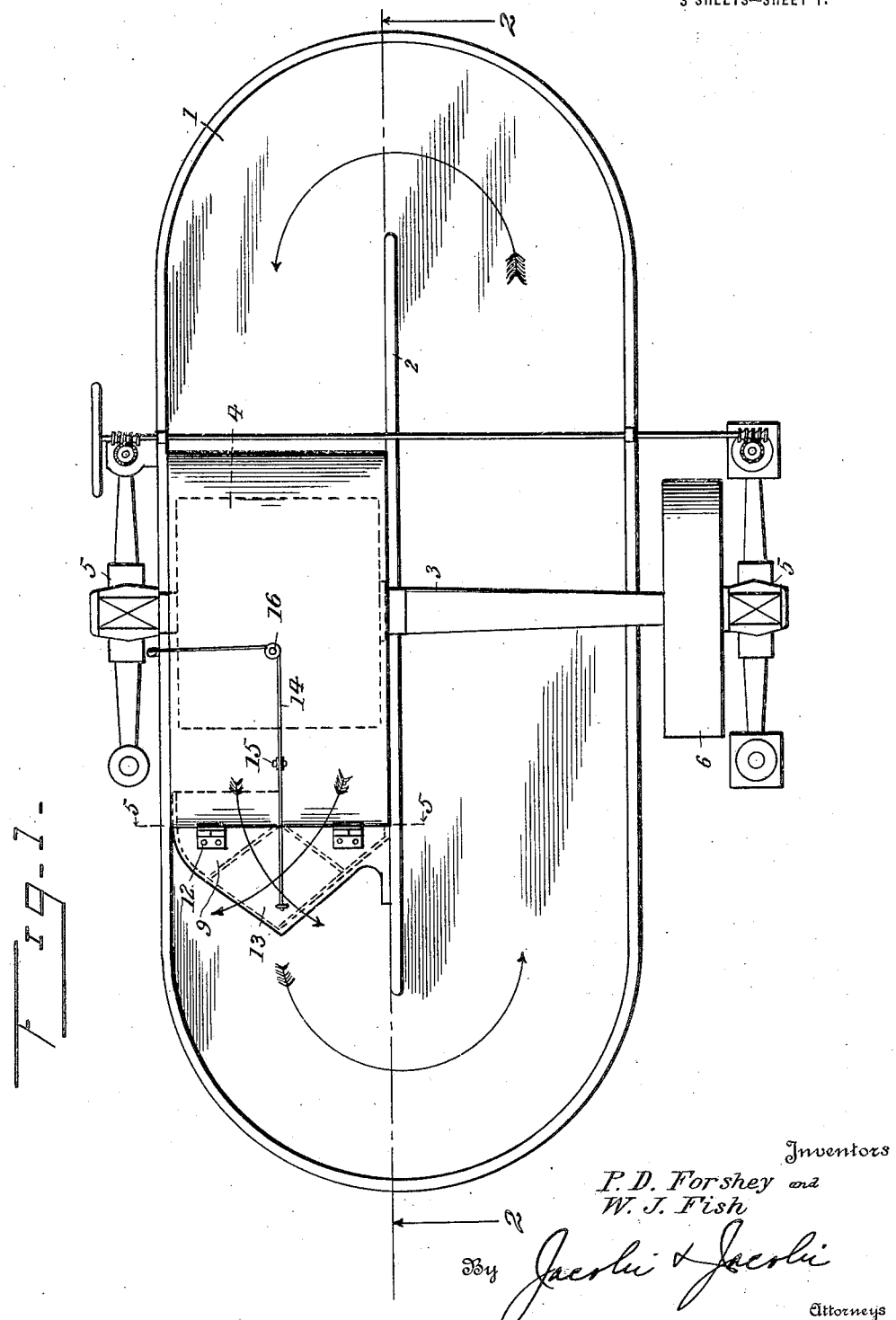
Figure 1 is a plan view of a pulp beating machine with our attachments applied to use therein.

In describing the invention we shall refer to the drawings, in which similar reference characters designate corresponding parts throughout the several views, and in which 1 designates a tub or vat of the usual or any preferred character utilized in connection with pulp beating machines, the same being provided with the usual division wall 2 in the center thereof, thus providing a course through which the pulp is disposed in the beating operation, as indicated by the arrows in Fig. 1 of the drawings. Mounted in the one side of the tub or vat 1 on a shaft 3 is a beater roll 4 of the usual or any preferred type, and the shaft 3 carried in the supports 5 has a drive pulley 6 mounted thereon to which is applied power from any desired source. Just back of the heater roll is the sloping back-fall board or the like 7, and disposed over the beater roll is a hood 8. These elements as hereabove described are of the usual formation, and we do not claim any novelty therein.

Figure 2:
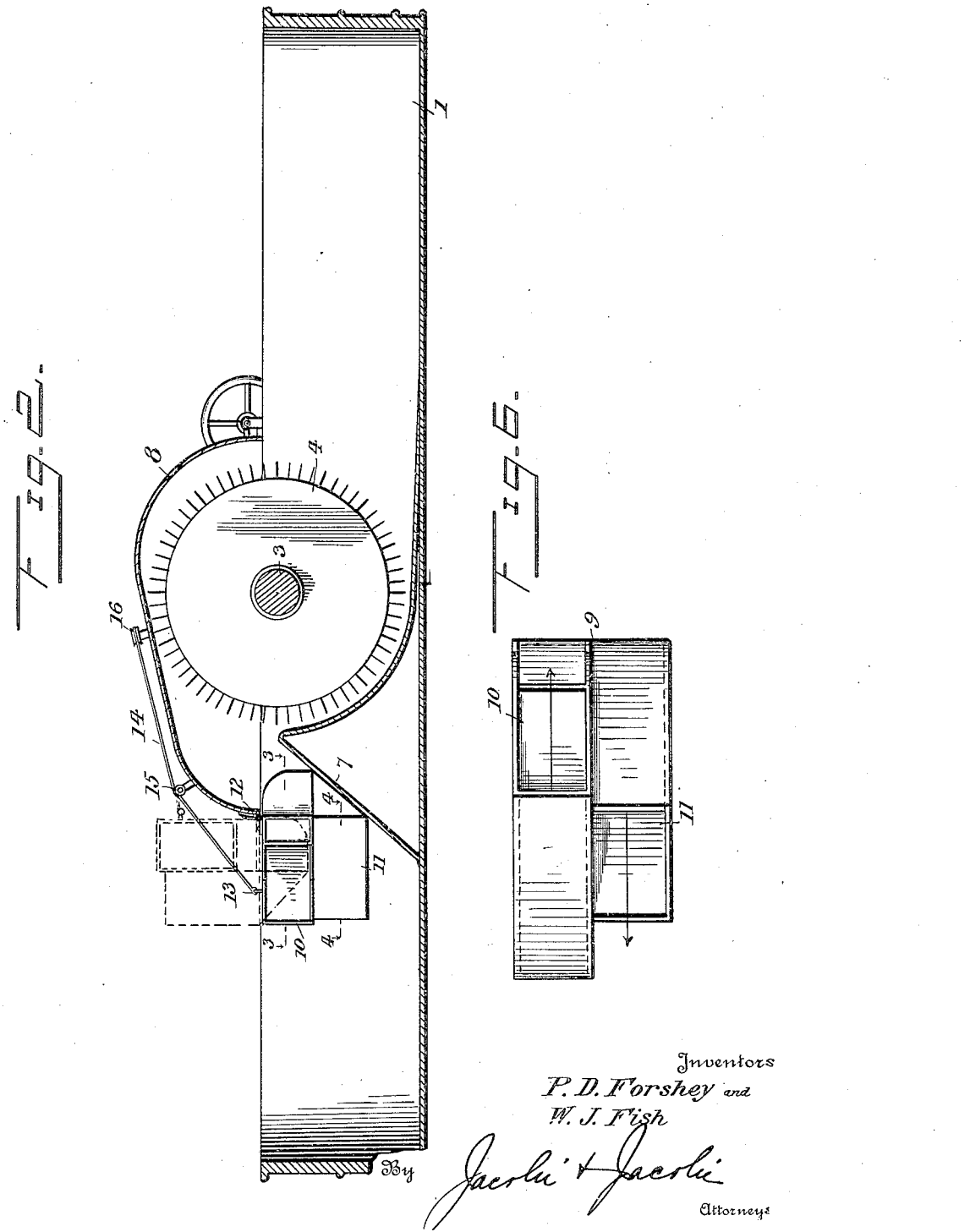
Fig. 2 is a longitudinal section therethrough as seen on the line 2—2 of Fig. 1.
Figure 3:
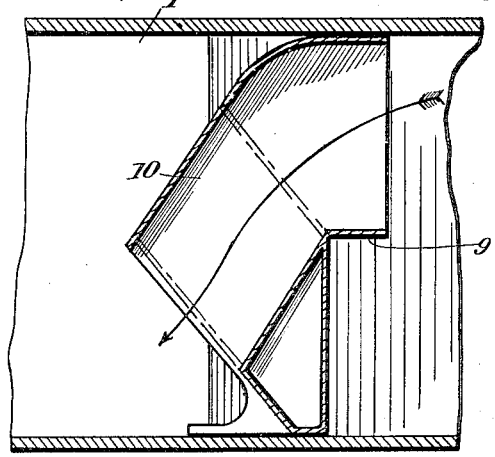
Fig. 3 is a horizontal section as seen on the line 3—3 of Fig. 2.
Figure 4:
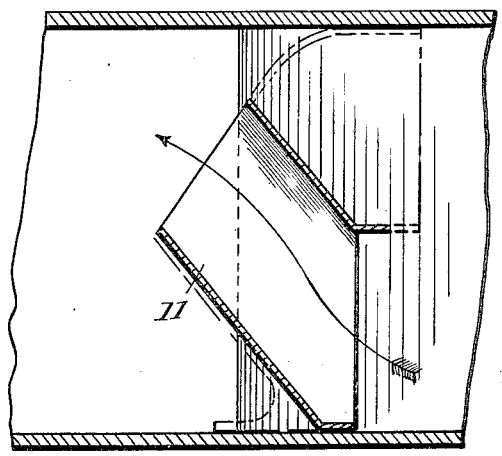
Fig. 4 is a similar view as seen on the line 4—4 of Fig. 2.
Figure 5:
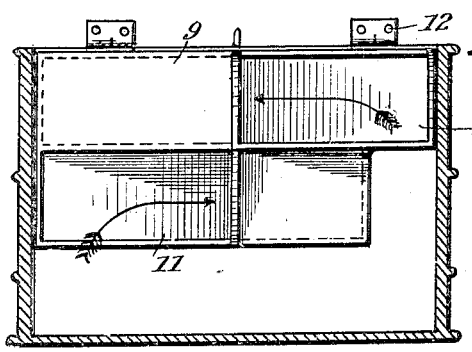
Fig. 5 is a vertical sectional view as seen on the line 5—5 of Fig. 1.

Our invention contemplates the provision of a member back of the beater roll to change the course of the pulp disposed from said roll through the vat or tub 1. To this end we provide a member 9 preferably formed of metal and composed of an upper angular spout or channel 10 and a lower diagonally disposed spout of channelway 11, the former being disposed in a horizontal plane above the latter, as clearly shown in Fig. 6 of the drawing. This member is hinged as at 12 to the hood 8, and the lower portion of the same is adapted to rest upon the back-fall board or the like 7, as shown in Fig. 2 of the drawings.

From this construction it will be seen that a member is provided whereby as the pulp is directed in its course from the beater roll, the stock along one side of the vat will be directed to the opposite side thereof and vice versa. Thus, a better circulation will be afforded, a more uniform length of fibre provided and the beating time considerably reduced.

As stated, this member 9 is hingedly supported on the hood 8, and connected therewith at a point designated as 13 is a cable extending over a pulley 15 mounted on the forward portion of the hood 8 and around an additional pulley 16 on said hood. This cable then extends downwardly along the side of the vat and has weights or the like (not shown) connected thereto whereby under normal conditions this attachment will be held in raised position, as shown in dotted lines in Fig. 2.

From the foregoing description of the construction of our improved device, the operation thereof will be readily understood and it will be seen that we have provided a simple, inexpensive and efficient means for carrying out the objects of the invention.

While we have particularly described the elements best adapted to perform the functions set forth, it is obvious that various changes in the form, proportion and in the minor details of construction may be resorted to without departing from the spirit or sacrificing any of the principles of the invention.

What we claim is:

1. In a machine of the class described, the combination with a tub, a beater roll mounted therein and a hood for said beater roll; of means pivotally supported on said hood to interchange the circulation of the stock directed through said tub from the beater roll.

2. In a machine of the class described, the combination with a tub, a beater roll operatively mounted therein, and a hood for said roll; of a member pivotally supported on said hood and provided with means to direct the stock leaving said roll from one side of the tub to the other.

3. In a machine of the class described, the combination with a tub, a beater roll operatively mounted therein, a sloping back-fall board arranged in the tub adjacent said roll, and a hood for said roll, of a member pivotally carried on said hood and adapted for support on said back-fall board whereby to provide means for the interchanging of the course of the pulp from one side of the tub to the other, as said pulp leaves the beater roll.

4. In a machine of the class described, the combination with a tub, beater roll operatively mounted therein, a back-fall board disposed adjacent said roll, and a hood for said roll; of a member pivotally carried on said hood and adapted to be supported on said back-fall board to interchange the course of the pulp from one side of the tub to the other as said pulp leaves the roll, and means for normally retaining said member in its raised and inoperative position.

In testimony whereof we affix our signatures.

PAUL D. FORSHEY,
WINFIELD J. FISH.